UNITED STATES PATENT OFFICE 1,944,021

TREATMENT OF WET OIL

John Charles Walker, Eldorado, Kans., assignor to Empire Oil & Refining Company, Bartlesville, Okla., a corporation of Delaware No Drawing. Application May 27, 1927
Serial No. 194,845

40 Claims. (Cl. 196—4)

This invention relates to the treatment of wet oil, and more particularly to a method of and chemical reagent for treating petroleum oil associated with natural waters in such a way as to prevent the formation of resistant BS emulsions of the water-in-oil type and to resolve any emulsions of the above character previously formed.

The invention herein described is a partial continuation of and improvement on my co-pending application, Ser. No. 148,315, filed Nov. 13, 1926.

Various methods have been proposed for treating the comparatively stable so-called BS emulsions which, because of their relatively large volumes and the difficulties which they offer to distillation or other treatment, constitute such a serious problem to the oil industry. It has been proposed, also, to treat petroleum oils prior to their removal from the producing wells in such a way as to prevent the formation of these BS emulsions.

The primary object of the present invention is to provide an improved method for treating wet oils to inhibit the formation of BS emulsions of the water-in-oil type and to resolve such emulsions into their several constituents in cases where they have already formed.

One feature of the invention consists in providing a reagent for treating wet oils of such character that it may advantageously be used in some cases in conjunction with other less expensive materials, such for example, as with up to 50% of its weight of polymers of the unsaturated hydrocarbon content of oil still gases and the like, in the effective treatment of wet oils.

With these and other objects and features in view the invention consists in the method of and reagent for treating wet oils hereinafter described and more particularly defined in the claims.

According to the present invention a reagent comprising either a water solution or a colloidal solution or suspension of one or more of the class of compounds hereinafter mentioned is either forced into the oil well in such a manner that it mingles with the wet oil therein, or else is added to the wet oil after it has been removed from the well, preferably in the pipe lines or settling tanks located adjacent to the well.

The substances for treating mixtures of oil and water to prevent the formation of BS emulsions of the water-in-oil type and to break down such emulsions in case they have already formed, according to the present invention comprise the sulfo-acids of certain polynuclear aromatic hydrocarbon compounds which have had one or more of the hydrogen atoms of their nuclei replaced by a hydrocarbon radical preferably derived from a secondary alcohol, or the salt formed by neutralizing such sulfo-acids with ammonia or an alkali. The preferred reagent consists of the material formed by neutralizing with ammonia the reaction product of the sulphonation under controlled conditions of a mixture of naphthalene sulphonic acid and isopropyl alcohol.

The preferred reagent may be prepared as follows:

Commercial naphthalene is sulphonated with an excess of concentrated (66° Bé.) sulfuric acid added slowly and with vigorous stirring under conditions yielding a mixture of alpha and beta naphthalene mono-sulfonic acids, with the beta acid largely predominating (about 85% beta and 15% alpha acid). The temperature of this sulfonation is maintained within a range of from 170° C. to 176° C. throughout a four hour period, with constant agitation of the reaction mixture. The reaction product of this sulfonation treatment is used without purification in preparing the de-emulsifying reagents of the present invention. In addition to alpha and beta naphthalene mono-sulfonic acids this reaction mass contains small amounts of unchanged naphthalene, free sulfuric acid and other sulfonation products. To every twenty parts by weight of the above sulfonation mass there is added fifteen parts of isopropyl alcohol and fifteen parts of concentrated sulfuric acid (specific gravity 1.84), this second treatment being carried on at a temperature of 80° C. to 82° C. with continuous agitation. The preferred method of carrying on this second treatment for the purpose of effecting the substitution of an isopropyl group for hydrogen in the naphthalene nucleus is as follows: Five parts of isopropyl alcohol are first added very slowly to the sulfonation mass resulting from the primary sulfonation treatment of naphthalene. After allowing a short interval for thorough mixing, five parts of concentrated sulfuric acid is slowly added to the mixture thus formed. After allowing the substitution reaction thus set up to proceed for about a half hour, an additional five parts each of the alcohol and of the sulfuric acid are added in the same manner followed in the first addition step of this treatment. After the reaction has proceeded for another half hour period a third addition of isopropyl alcohol and sulfuric acid is made in the same manner as before. After this final addition of alcohol and sulfuric acid the reaction mass is maintained at the desired temperature of 80° C. to 82° C. for an additional two hours with constant agitation, so that the total time required to complete this second reaction and coupling treatment comprises three hours. The reaction product of this second treatment is passed while still hot into a separatory vessel and maintained in a quiescent state therein until a complete separation into two layers takes place. The lower layer consists in unchanged naphthalene sulfonic acid, sulfuric acid, isopropyl alcohol, water and other reaction products of the alcohol and sulfuric acid, including polymers. The upper oil layer is the desired "coupled" product, which will hereinafter be referred to as propylated naphthalene sulfonic acid. This sulfonic acid is itself a very effective reagent for inhibiting the formation of, and for breaking down, BS emulsions. However even better reagents are formed by neutralizing the acid product with alkali metal or alkaline earth hydroxides, or preferably with ammonia, to form the neutral or even slightly alkaline salt constituting the preferred emulsion inhibiting and emulsion splitting reagent of the present invention. The exact composition of this preferred reagent is not definitely known, but it is believed to be a mixture of the ammonia salts of mono-, di-, tri-, tetra- and perhaps even higher propylated alpha and beta naphthalene sulfonic acids, with the dipropylated beta-naphthalene sulfo-acid salt predominating.

The various mixtures of neutral salts of "modified" naphthalene sulfonic acids obtainable by the above sulfonation treatment have been found to be very effective reagents both in preventing the formation of BS emulsions of the water-in-oil type and in breaking down the most stable of such emulsions. Likewise the mixtures of "coupled" sulfonic acids from which such neutral salts are formed have been found to be very effective both in inhibiting formation of such emulsions and in causing an effective split of emulsions already formed. It has been found, however, that the neutral or alkaline salts are more effective treating agents than the acids from which they are formed. Moreover the ammonia salt of any of the individual sulfonic acids making up the preferred reagent is much more effective than the sulfonic acid itself, and is also more effective than the sodium or potassium salts. Furthermore, the crude mixture of ammonium salts constituting the preferred reagent is more effective than an equivalent amount of a pure ammonium salt of any one of the pure mono-, di-, tri-, or tetra-propylated naphthalene sulfo acids embodied in the preferred reagent. It is believed that the greater effectiveness of the mixture of neutral salts making up the preferred reagent, as a treating agent for wet oils of the class described, can be explained by the fact that the formation and stability of these resistant BS emulsions appear to be largely the result of surface tension effects. Accordingly, as surface tension effects can also be relied on as a basis for the development of a process for treating wet oils to inhibit the formation of BS emulsions and to break them down, and as it has now been found that the surface tension lowering effects of certain classes of emulsion inhibiting and emulsion breaking reagents are additive, it is believed that where two or more reagents are used together, either of which has the property of breaking water-in-oil emulsions by reason of its lowering effect on surface tension of water, the mixture formed will in some cases at least have a lowering effect on the surface tension of the water or dispersed phase of the emulsion which is additive with respect to the lowering effect of an equivalent amount of any individual component of the treating mixture, and will therefore cause a more efficient break in emulsions already formed or will be more effective in inhibiting emulsion formation. The greater effectiveness of the ammonium salts over the alkaline and alkaline earth salts of the coupled sulfo-acid can likewise be explained by the fact that in water solution ammonia tends to decrease or lower the surface tension, whereas caustic soda in water solution tends to increase or raise the surface tension.

In the practical application of the present invention it is preferred to inject a water solution or suspension, or a solution or suspension in oil, of one of the substances just mentioned into the casing head of the particular oil well giving trouble with formation of BS emulsion continuously during the period in which oil is being removed from the well. However, in cases where it is found more practicable to treat the wet oil after it has been pumped from the well and after the BS emulsions have formed by reason of agitation set up in the well, this may be done by injecting a predetermined amount of the treating agent into the pipe lines leading from the well during the periods in which the well is in operation, or by adding suitable amounts of the treating agent to the wet oil after it has been separated from the unemulsified portion of its water content in settling tanks adjacent the head of the well casing.

Thus when the treatment is carried on above ground the chief function of the treating agent will be that of breaking emulsions which have already formed, whereas in carrying on the treatment within the well the chief function of the treating agent will be to condition the oil-water mixture so as to inhibit the formation of BS emulsions of the water-in-oil type. In carrying on the treatment above ground the treating agent is preferably added to the oil containing emulsion as it enters the lead lines at the top of the well, so that a thorough mixing of the treating agent with the wet oil takes place prior to the time that the wet oil enters the settling and collecting tanks.

In some cases it may be found necessary to carry on the de-emulsification treatment in a special tank fitted up with agitators and a steam heating coil. By increasing the temperature of the oil the viscosity is considerably lowered and this lowering of viscosity assists materially in effecting the active breaking down of the emulsion and increasing the rapidity with which the water or brine of the emulsion settles to the bottom of the tank.

The quantity of reagent which must be used in any given case in order to prevent the formation of the emulsions or to break down the emulsions after they have already formed, is dependent upon several factors. Among the factors determining the amount of treating agent which should be used are the age of emulsions already formed in the oil, the character of the constituents of the wet oil causing it to emulsify on agitation, the composition of the brines associated with the oil, the proportions of oil, water and gas associated in the wet oil under treatment, and the amount of agitation imparted to the wet oil during periods in which the well is producing, affecting the size of dispersed water particles in the emulsion.

It has been found that concentrated solutions of the preferred treating agent above referred to will break the most stubborn emulsions when used in amounts of less than 1% by volume of the wet oil being treated. In general less than ½% by volume of the concentrated treating agent will be effective for preventing the formation of emulsions.

While it is believed that the action of the treating agents of the present invention in preventing the formation of BS emulsions and in breaking down such emulsions is chiefly of a physical or a physico-chemical nature, i. e. largely the result of surface tension effects, it is to be understood that the invention is not based or dependent upon or limited to any theory except such as specifically set forth in the accompanying claims. It is believed that several chemical and physical characteristics of the treating agents of the present invention contribute materially toward their great effectiveness in preventing the formation of BS emulsions and in disrupting such emulsions. In the first place it has been observed that the molecules of the preferred treating agent possess a high degree of polarity toward water and accordingly produce a rapid initial drop effect on the surface tension of the water. The isopropyl naphthalene sulfoacids are soluble in water, including salt water, in the amounts used for effectively treating the wet oils, as are also their alkali and ammonium salts. Moreover the alkaline earth salts of the reagents of the present inventions are sufficiently water-soluble so that with the amounts of treating agent used such salts, including the calcium and magnesium salts, are not precipitated and accordingly have no stabilizing action on the emulsion component of the wet oil under treatment. Because of this property of the alkaline earth salts of the present treating agents, the treating agent in the amounts used has no substantial effect on the hardness of the water associated with the wet oil. Another noticeable characteristic of the present treating agents is that they, as shown for example by the isopropyl naphthalene sulfo-acids and their salts, including the barium salt, are more soluble in hexyl alcohol than they are in water, and accordingly can be extracted by means of hexyl alcohol from their water solutions. It has been found, however, that the barium salts of the reagent are insoluble in petroleum ether.

While the preferred treating agent of the present invention is the mixture of ammonium salts formed by neutralizing with ammonia the coupled product of a mixture of crude isopropyl alcohol and crude naphthalene sulfo acids, it will be understood that other aromatic hydrocarbons, other esterifying reagents, and other sources of hydrocarbon radicles for substitution in the aromatic nucleus may be employed. For example anthracene, phenanthrene and other polynuclear hydrocarbon compounds may have one or more of the hydrogen atoms in their nuclei replaced by an alkyl, aryl, or aralkyl radicle, especially one derived from an alcohol such as isopropyl or secondary butyl alcohol, by the action of an organic or inorganic acid esterifying agent such as hydrochloric or nitric acid. The sulfo-acid of a poly-nuclear hydrocarbon containing a hydroxyl group, for example beta-naphthol sulfo-acid, may be used in place of the aromatic hydrocarbon sulfo-acid, and likewise the hydrocarbon group which is substituted in the aromatic nucleus may contain halogen, hydroxyl or aminol groups.

It has been found that the preferred reagent of the present invention when added to wet oils in the proportions specified above will lather freely with the hard water associated with the oil under treatment without causing the precipitation of insoluble alkaline earth salts from the salt water, the solution merely becoming somewhat opalescent, due to colloidal suspension of polymers associated with the reagent. Moreover it has been found that for treating BS emulsions containing large amounts of finely divided solid matter or dirt suspended therein, the de-emulsifying qualities of the present treating agent can be improved by the addition of a small amount of cresylic acid, say 10% by weight. The cresylic acid component of this modified treating agent apparently has the property of removing adsorbed oil from the dirt, thus allowing the dirt to sink to the bottom of the tank. When the adsorbed oil is not separated from the dirt the buoyancy of the oil tends to raise the dirt to the top of the settled water and thereby increases the difficulty of separating the water from the supernatant oil.

It has been observed that for treating some types of wet oils, the addition of up to 50% by weight of some less expensive material, and particularly of unsaturated hydrocarbon compounds such as the olefine polymers, chiefly dimers (polymerized propylene, butylene, amylene and the like) which are formed as a by-product in the manufacture of isopropyl alcohol by sulfating refinery tail gases, to the preferred isopropyl naphthalene sulfo-acid treating compound, does not materially lessen the effectiveness of the treating compound and in some cases even increases its effectiveness in promoting a disruption of the BS emulsions under treatment.

Although the method of treating oils and the reagents to be used have been referred to as particularly adapted for preventing the formation of petroleum oil emulsions and for dehydrating such emulsions, it is to be understood that the method and the reagents are not limited to such use but may be effectively employed in the treatment of mixtures of water and other types of oil and in the treatment of other types of emulsion.

The term "coupled poly-cyclic hydrocarbon compound" has been used in the claims as a generic term to define a product having a poly-cyclic hydrocarbon nucleus in which one or more alkyl, aryl or aralkyl radicles and one or more strongly polar negative groups are substituted in place of a corresponding number of nucleal hydrogen atoms.

The various features of the invention having been thus described, what is claimed as new is:

1. The method of treating mixtures of oil and water to prevent the formation of emulsions of the water-in-oil type and to resolve any such emulsions already formed, comprising admixing with such wet oil a material containing a di-isopropyl naphthalene sulfo group.

2. The method of treating mixtures of oil and water to prevent the formation of emulsions of the water-in-oil type and to resolve any such emulsions already formed, comprising admixing therewith a material containing a salt of an isopropyl naphthalene sulfo-acid.

3. The method of treating mixtures of oil and water to prevent the formation of emulsions of the water-in-oil type and to resolve any such emulsions already formed, comprising admixing therewith a material containing the ammonium salt of an isopropyl naphthalene sulfo-acid.

4. The method of treating mixtures of oil and water to prevent the formation of emulsions of the water-in-oil type and to resolve any such emulsions already formed, comprising admixing therewith a material comprising a coupled poly-cyclic hydrocarbon compound in an amount not more than 1% by volume of the wet oil under treatment.

5. The method of treating mixtures of oil and water to prevent the formation of emulsions of the water-in-oil type and to resolve any such emulsions already formed, comprising admixing with the wet oil a reagent comprising an alkylated naphthalene sulfo-compound.

6. The method of treating mixtures of oil and water to prevent the formation of emulsions of water-in-oil type and to resolve any such emulsions already formed, comprising admixing with the wet oil a reagent comprising a salt of alkylated naphthalene sulfo-compounds.

7. The method of treating mixtures of oil and water to prevent the formation of emulsions of the water-in-oil type and to resolve any such emulsions already formed, comprising admixing with the wet oil a reagent comprising the ammonium salt of an alkylated naphthalene sulfo-compound.

8. The method of treating mixtures of oil and water to prevent the formation of emulsions of the water-in-oil type and to resolve any such emulsions already formed, comprising admixing with such wet oil a reagent comprising the ammonium salts of the mixture of compounds formed on alkylating a mixture of commercial naphthalene sulfonic acids with commercial isopropyl alcohol at a temperature of 80–82° C. in the presence of concentrated sulfuric acid.

9. The method of treating mixtures of oil and water to prevent the formation of emulsions of the water-in-oil type and to resolve any such emulsions already formed, comprising admixing with such wet oil a reagent comprising the ammonium salts of the mixture of compounds formed on alkylating a mixture of twenty parts by weight of commercial naphthalene sulfonic acids with fifteen parts by weight of commercial isopropyl alcohol, in the presence of fifteen parts by weight of concentrated sulfuric acid.

10. The method of treating mixtures of oil and water to prevent the formation of emulsions of the water-in-oil type and to resolve any such emulsions already formed, comprising admixing with such wet oil a reagent comprising a coupled poly-cyclic aromatic hydrocarbon compound admixed with not more than 50% by weight of olefin polymers.

11. The method of treating mixtures of oil and water to prevent the formation of emulsions of the water-in-oil type and to resolve any such emulsions already formed, characterized by subjecting the wet oil to the action of a treating agent comprising a poly-cyclic aromatic hydrocarbon group chemically combined with an alkyl radical containing more then two carbon atoms.

12. The method of treating mixtures of oil and water to prevent the formation of emulsions of the water-in-oil type and to resolve any such emulsions already formed, characterized by subjecting the wet oil to the action of a treating agent comprising a nucleal alkylated compound of the naphthalene series.

13. The method of treating mixtures of oil and water to prevent the formation of emulsions of the water-in-oil type and to resolve any such emulsions already formed, characterized by subjecting the wet oil to the action of a treating agent comprising a poly-cyclic aromatic sulpho compound which has been substituted in its nucleus with a hydrocarbon radical.

14. The method of treating mixtures of oil and water to prevent the formation of emulsions of the water-in-oil type and to resolve any such emulsions already formed, characterized by subjecting the wet oil to the action of a treating agent comprising an alkylated poly-cyclic aromatic sulpho acid compound.

15. The method of treating mixtures of oil and water to prevent the formation of emulsions and to resolve any emulsions already formed, characterized by subjecting the wet oil to the action of a treating agent comprising a propylated poly-cyclic aromatic sulpho acid compound.

16. The method of treating mixtures of oil and water to prevent the formation of emulsions and to resolve any emulsions already formed, characterized by subjecting the wet oil to the action of an alkaline treating agent containing an alkyl substituted poly-cyclic sulphonic group.

17. The method of resolving a petroleum emulsion of the water-in-oil type, which comprises subjecting the emulsion to the action of a demulsifying agent comprising a coupled re-action product of a polycyclic aromatic body and a secondary alcohol.

18. The method of resolving a petroleum emulsion of the water-in-oil type, which comprises subjecting the emulsion to the action of a demulsifying agent comprising a coupled product of a polycyclic sulfonic body and a secondary alcohol.

19. The method of resolving a petroleum emulsion of the water-in-oil type, which comprises subjecting the emulsion to the action of a demulsifying agent comprising the alkylated product of a polycyclic sulfonic body.

20. The method of resolving a petroleum emulsion of the water-in-oil type, which comprises subjecting emulsion to the action of an alkaline salt of an alkylated polycyclic sulfonic acid.

21. A process for breaking a petroleum emulsion of the water-in-oil type, which comprises subjecting the emulsion to the action of a demulsifying agent containing a substituted bicyclic aromatic sulfonic body of the type $XRR^1 SO_3Z$, wherein $X$ is bicyclic aromatic nucleus; $RR^1$ represents not fewer than two alcohol residues derived from alcohols having fewer than twelve carbon atoms each; $SO_3$ represents the conventional sulfonic acid residue; and $Z$ represents an hydrogen ion equivalent.

22. A process for breaking a petroleum emulsion of the water-in-oil type, which consists in subjecting the emulsion to the action of a demulsifying agent containing a water-soluble substituted polycyclic aromatic sulfonic body of the type $XRR^1 SO_3Z$, wherein $X$ is a polycyclic aromatic nucleus; $RR^1$ represents not fewer than two alcohol residues derived from alcohols having fewer than twelve carbon atoms each; $SO_3$ represents the conventional sulfonic acid residue; and $Z$ represents an hydrogen ion equivalent, said demulsifying agent being also characterized by the fact that it will produce an insoluble precipitate with a soluble alkaline earth salt.

23. A process for breaking a petroleum emulsion of the water-in-oil type, which consists in subjecting the emulsion to the action of a demulsifying agent containing a water-soluble substituted polycyclic aromatic sulfonic body of the type $XRR^1SO_3Z$; wherein $X$ is a polycyclic aromatic nucleus; $RR^1$ represents not fewer than two alcohol residues derived from alcohols having fewer than 12 carbon atoms each; $SO_3$ represents the conventional sulfonic acid residue, and $Z$ represents a metallic ion equivalent, said demulsifying agent being also characterized by the fact that it will produce an insoluble precipitate with a soluble alkaline earth salt.

24. A process for breaking a petroleum emulsion of the water-in-oil type, which consists in subjecting the emulsion to the action of a demulsifying agent containing a water-soluble substituted polycyclic aromatic sulfonic body of the type $XRR^1SO_3Z$; wherein $X$ is a polycyclic aromatic nucleus; $RR^1$ represents not fewer than two alcohol residues derived from alcohols having fewer than twelve carbon atoms each; $SO_3$ represents the conventional sulfonic acid residue, and $Z$ represents an ammonium radical, said demulsifying agent being also characterized by the fact that it will produce an insoluble precipitate with a soluble alkaline earth salt.

25. The process for breaking a petroleum emulsion of the water-in-oil type, which comprises subjecting the emulsion to the action of a demulsifying agent containing a substituted bicyclic aromatic sulfonic body of the type $XYSO_3Z$, wherein $X$ is a bicyclic aromatic nucleus; $Y$ represents an organic radical belonging to one of the alkyl, aryl, and aralkyl groups; $SO_3$ represents the conventional sulfonic acid residue; and $Z$ represents an hydrogen ion equivalent.

26. A process for breaking a petroleum emulsion of the water-in-oil type, which comprises subjecting the emulsion to the action of a demulsifying agent containing a water-soluble substituted polycyclic aromatic sulfonic body of the type $XYSO_3Z$, wherein $X$ is a polycyclic aromatic nucleus; $Y$ represents an organic radical belonging to one of the alkyl, aryl, and aralkyl groups; $SO_3$ represents the conventional sulfonic acid residue; and $Z$ represents a hydrogen ion equivalent.

27. A process for breaking a petroleum emulsion of the water-in-oil type, which comprises subjecting the emulsion to the action of a demulsifying agent containing a water-soluble substituted polycyclic aromatic sulfonic body of the type $XYSO_3Z$, wherein $X$ is a polycyclic aromatic nucleus; $Y$ represents an organic radical belonging to one of the alkyl, aryl, and aralkyl groups; $SO_3$ represents a conventional sulfonic acid residue, and $Z$ represents a metallic ion equivalent.

28. A process for breaking a petroleum emulsion of the water-in-oil type, which comprises subjecting the emulsion to the action of a demulsifying agent containing a water-soluble substituted polycyclic aromatic body of the type $XYSO_3Z$, wherein $X$ is a polycyclic aromatic nucleus; $Y$ represents an organic radical belonging to one of the alkyl, aryl, or aralkyl groups; $SO_3$ represents the conventional sulfonic acid residue; and $Z$ represents an ammonium radical.

29. A process for breaking a petroleum emulsion of the water-in-oil type, which comprises subjecting the emulsion to the action of a demulsifying agent containing a substituted aromatic sulfonic body of the type $XRR^1SO_3Z$; wherein $X$ is an aromatic nucleus; $RR^1$ represents not fewer than two alcohols residues derived from alcohols having fewer than twelve carbon atoms each; $SO_3$ represents the conventional sulfonic acid residue; and $Z$ represents an hydrogen ion equivalent.

30. A process for breaking a petroleum emulsion of the water-in-oil type, which consists in subjecting the emulsion to the action of a demulsifying agent containing a water-soluble substituted aromatic sulfonic body of the type $XRR^1SO_3Z$, wherein $X$ is an aromatic nucleus; $RR^1$ represents not fewer than two alcohol residues derived from alcohols having fewer than twelve carbon atoms each, and further identified by the fact that the carbon atoms in $RR^1$ must total five or more; $SO_3$ represents the conventional sulfonic acid residue; and $Z$ represents an hydrogen ion equivalent, said demulsifying agent being also characterized by the fact that it will produce an insoluble precipitate with a soluble alkaline earth salt.

31. The process for breaking a petroleum emulsion of the water-in-oil type, which comprises subjecting the emulsion to the action of a demulsifying agent containing a water-soluble substituted aromatic sulfonic body of the type $XYSO_3Z$, wherein $X$ is an aromatic nucleus; $Y$ represents an organic radical belonging to one of the alkyl, aryl, and aralkyl groups; $SO_3$ represents the conventional sulfonic acid residue; and $Z$ represents one of the conventional hydroxy, halogen, and amino groups.

32. The process for breaking a petroleum emulsion of the water-in-oil type, which comprises subjecting the emulsion to the action of a demulsifying agent containing a substitued aromatic sulfonic body of the type $XYSO_3Z$, wherein $X$ is an aromatic nucleus; $Y$ represents an organic radical belonging to one of the alkyl, aryl, and aralkyl groups; $SO_3$ represents the conventional sulfonic acid residue; and $Z$ represents one of the conventional hydroxy, halogen, and amino groups.

33. A process for breaking a petroleum emulsion of the water-in-oil type, which comprises subjecting the emulsion to the action of a demulsifying agent containing a substituted polycyclic aromatic sulfonic body of the type $XYSO_3Z$, wherein $X$ is a polycyclic aromatic nucleus; $Y$ represents an organic radical belonging to one of the alkyl, aryl, and aralkyl groups; $SO_3$ represents the conventional sulfonic acid residue; and $Z$ represents one of the conventional hydroxy, halogen, and amino groups.

34. A process for breaking a petroleum emulsion of the water-in-oil type, which comprises subjecting the emulsion to the action of a demulsifying agent containing a substituted polycyclic aromatic sulfonic body of the type $XYNZ$, wherein $X$ is a polycyclic aromatic nucleus; $Y$ represents an organic radical belonging to one of the alkyl, aryl, and aralkyl groups; $N$ represents a strongly polar negative group equivalent to the conventional sulfonic acid residue; and $Z$ represents an hydrogen ion equivalent.

35. The process for breaking a petroleum emulsion of the water-in-oil type, which comprises subjecting the emulsion to the action of a demulsifying agent comprising a substituted polycyclic aromatic sulfonic body of the type $XYNZ$, wherein $X$ is a polycyclic aromatic nucleus; $Y$ represents an organic radical belonging to one of the alkyl, aryl, and aralkyl groups; $N$ represents a strongly polar negative group equivalent to the conventional sulfonic acid residue; and Z represents one of the conventional hydroxy, halogen, and amino groups.

36. A process for breaking a petroleum emulsion of the water-in-oil type, which comprises subjecting the emulsion to the action of a demulsifying agent comprising a substituted aromatic sulfonic body of the type XYNZ, wherein X is an aromatic nucleus; Y represents an organic radical belonging to one of the alkyl, aryl, and aralkyl groups; N represents a strongly polar negative group equivalent to a sulfonic acid residue; and Z represents one of the conventional hydroxy, halogen, and amino groups.

37. The method of treating mixtures of oil and water to prevent the formation of emulsions of the water-in-oil type and to resolve any such emulsions as have already formed, which comprises admixing therewith a reagent containing a polycyclic aromatic hydrocarbon nucleus having an alkyl radical and a strongly polar negative group linked therewith.

38. The method of treating mixtures of oil and water to prevent the formation of emulsions of the water-in-oil type and to resolve any such emulsions as have already formed, which comprises admixing therewith a reagent containing a bicyclic aromatic hydrocarbon nucleus having an alkyl radical and a strongly polar negative group linked therewith.

39. The method of treating a mixture of oil and water to prevent the formation of emulsions of the water-in-oil type and to resolve any such emulsions as have already formed, which comprises admixing therewith a reagent containing a polycyclic aromatic nucleus in which has been substituted a strongly polar negative group and an organic radical belonging to one of the alkyl, aryl, and aralkyl groups.

40. The method of treating a mixture of oil and water to prevent the formation of emulsions of the water-in-oil type, and to resolve any such emulsions as have already formed, which comprises admixing therewith a reagent containing an aromatic nucleus having substituted therein a strongly polar negative group and an organic radical belonging to one of the alkyl, aryl, and aralkyl groups, to which there is coupled one of the conventional hydroxy, halogen, and amino groups.

JOHN CHARLES WALKER.